United States Patent [19]

Nakabayashi et al.

[11] Patent Number: 4,819,208
[45] Date of Patent: Apr. 4, 1989

[54] BIODIRECTIONAL ELASTIC STORE CIRCUIT

[75] Inventors: Takeo Nakabayashi; Masao Nakaya, both of Hyogo, Japan

[73] Assignee: Mitsubishi Denki Kabushiki Kaisha, Tokyo, Japan

[21] Appl. No.: 42,531

[22] Filed: Apr. 27, 1987

[30] Foreign Application Priority Data

May 6, 1986 [JP] Japan .................. 61-105323

[51] Int. Cl.⁴ .................. H03K 17/56; H03K 17/687; G11C 7/02
[52] U.S. Cl. .................. 365/189; 307/242; 307/571; 307/575; 365/221
[58] Field of Search .................. 365/189, 221; 307/241-242, 571, 575

[56] References Cited

U.S. PATENT DOCUMENTS

| 4,138,732 | 2/1979 | Suzuki | 364/900 |
| 4,159,535 | 6/1979 | Fuhrman | 364/900 |
| 4,171,538 | 10/1979 | Sheller | 364/900 |
| 4,175,287 | 11/1979 | Fuhrman | 364/900 |
| 4,327,411 | 4/1982 | Turner | 364/900 |
| 4,629,909 | 12/1986 | Cameron | 307/443 |

FOREIGN PATENT DOCUMENTS

| 5464934 | 4/1977 | Japan . | |
| 71621 | 6/1977 | Japan . | |
| 3634332 | 4/1987 | Japan . | 307/571 |
| 5553935 | 10/1988 | Japan . | |

OTHER PUBLICATIONS

Fukeda, Yasukawa and Ohwada "256 Bit Elastic Store CMOS LSI".
J. Coffron and W. Long Practical Interfacing Techniques for Microprocessor System, Prentice Hall-Incorporated 1983; 43,46.

Primary Examiner—Stanley D. Miller
Assistant Examiner—M. R. Wambach
Attorney, Agent, or Firm—Lowe, Price, LeBlanc, Becker & Shur

[57] ABSTRACT

A bidirectional elastic store circuit comprises an elastic store portion (1) having a node (A) for writing data and a node (B) for reading out data, an input terminal (8) and an output terminal (9) for data communication in a first direction, an input terminal (10) and an output terminal (11) for data communication in a second direction opposite to the first direction, a group of logical circuits (13) for selecting either the input terminals (8, 10) and a group of logical circuits (14) for selecting either the output terminals (9, 11). At the time of data communication in the first direction, a switching signal EN1/EN2 applied from an input terminal (12) becomes high, so that the input terminal (8) and the output terminal (9) are coupled to the elastic store portion (1) through the nodes (A) and (B), respectively. On the other hand, at the time of data communication in the second direction, the switching signal EN1/EN2 becomes low, so that the input terminal (10) and the output terminal (11) are coupled to the elastic store portion (1) through the nodes (A) and (B), respectively.

6 Claims, 2 Drawing Sheets

BIDIRECTIONAL ELASTIC STORE CIRCUIT

BACKGROUND OF THE INVENTION

1. Field of the Invention

The present invention relates to a bidirectional elastic store circuit and more particularly, to an elastic store circuit capable of transmitting and receiving data in a bidirectional manner with a simple structure.

2. Description of the Prior Art

An elastic store circuit in the field of data communication is generally used for the purpose of multiplexing, data signalling rate conversion, phase variation absorption and the like. A large capacity of elastic store circuit in which store cells are arranged in a matrix manner is disclosed in, for example, Japanese Patent Publication Gazette No. 45544/1981.

FIG. 1 is a schematic block diagram showing a structure of a conventional elastic store circuit.

Description is now made on the structure of the conventional elastic store circuit shown in FIG. 1. In FIG. 1, an elastic store portion 1 comprises an address decoder (not shown), store cells (not shown) and the like, and has an input terminal 2 receiving a signal WR for initializing the write address of the elastic store portion 1 and an input terminal 3 receiving a signal RR for initializing the read address of the elastic store portion 1. In addition, a data input DI is applied to the elastic store portion 1 through an input terminal 4 and a data output DO of the elastic store portion 1 is outputted through an output terminal 5. Furthermore, a logical element 7 is connected between the elastic store portion 1 and the output terminal 5 so as to enable a wired OR function. The logical element 7 is controlled by a chip selecting signal CS inputted from a chip selecting signal input terminal 6.

Description is now made on operation of the conventional elastic store circuit shown in FIG. 1. The data DI inputted through the input terminal 4 is written into each store cell (not shown) constituting the elastic store portion 1 while the address is controlled by the write address initialization signal WR applied through the input terminal 2. At the time of read-out, the data DO is read out from each store cell and is outputted through the output terminal 5 while the address is controlled by the read address initialization signal RR applied through the input terminal 3. The data output DO is selected by the chip selecting signal CS applied to the chip selecting signal input terminal 6, so that the wired OR function is achieved.

However, since the conventional elastic store circuit has only a single data input terminal and a single data output terminal as described above, it can be used only for data transmission and reception in a single direction. Therefore, when it is intended to be used for a bidirectional data communication system, at least two elastic store circuits are required to receive and transmit data in a first direction and receive and transmit data in a second direction opposite to the first direction, so that the number of components of the system is increased and the system becomes expensive.

SUMMARY OF THE INVENTION

Briefly stated, the present invention provides a bidirectional elastic store circuit comprising an elastic store portion having a data write terminal and a data read terminal, a first input terminal receiving a data input in a first direction, a second input terminal receiving a data input in a second direction opposite to the first direction, a first output terminal applying a data output in the first direction, a second output terminal applying a data output in the second direction, first switching means for selecting either the first input terminal or the second input terminal and connecting it to the data write terminal of the elastic store portion, second switching means for selecting either the first output terminal or the second output terminal and connecting it to the data read terminal of the elastic store portion, and control means for driving simultaneously the first switching means and the second switching means so that the first input terminal and the first output terminal may be simultaneously selected or the second input terminal and the second output terminal may be simultaneously selected.

In accordance with another aspect of the present invention, the first input terminal and the second input terminal are coupled to each other to form a first input/output terminal and the first output terminal and the second input terminal are coupled to each other to form a second input/output terminal.

Accordingly, a primary object of the present invention is to provide a bidirectional elastic store circuit capable of independently performing bidirectional data communication, i.e. transmission and reception of data.

A principal advantage of the present invention is that a single elastic store circuit is provided with two data input terminals and two data output terminals, and the input terminals and the output terminals are switched in a time-divisional manner when data is transmitted and received in first and second directions, so that bidirectional transmission and reception of data can be performed in a single elastic store circuit.

Another advantage of the present invention is that the number of components of a bidirectional data communication system can be reduced, so that the reduced and low-price system can be achieved.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
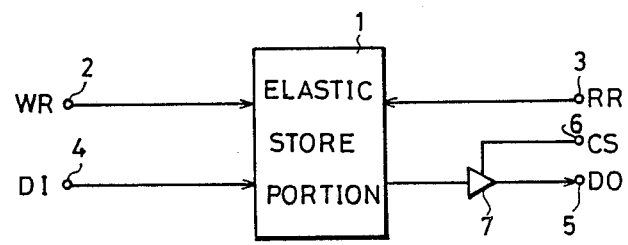
FIG. 1 is a block diagram showing a conventional elastic store circuit.
Figure 2:
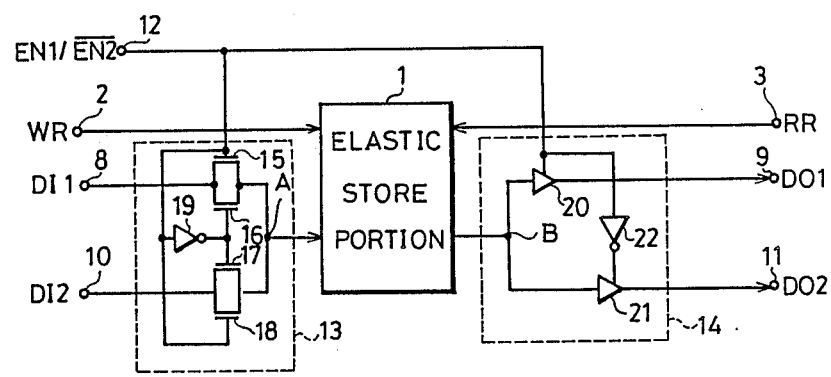
FIG. 2 is a block diagram showing a bidirectional elastic store circuit according to an embodiment of the present invention.

FIG. 2 is a schematic block diagram showing a structure of a bidirectional elastic store circuit according to an embodiment of the present invention. Description is now made on the structure according to an embodiment of the present invention shown in FIG. 2. In FIG. 2, an elastic store portion 1, which is the same as the conventional elastic store portion 1 shown in FIG. 1, comprises an address decoder (not shown), store cells (not shown) and the like. A signal WR for initializing the write address of the elastic store portion 1 is applied to an input terminal 2 and a signal RR for initializing the read address of the elastic store portion 1 is applied to an input terminal 3. In addition, a data input DI1 is applied to an input terminal 8 in a first direction and a data output DO1 is sent from an output terminal 9 in the first direction. On the other hand, a data input DI2 is applied to an input terminal 10 in a second direction opposite to the first direction and a data output DO2 is sent from an output terminal 11 in the second direction. Furthermore, a switching signal EN1/$\overline{EN2}$ selecting the direction in which data is transmitted and received, that is, the first direction or the second direction is applied to an input terminal 12. In response to the switching signal EN1/$\overline{EN2}$ applied to the input terminal 12, a group of logical circuits 13 selects either the input terminal 8 or 10 and connects it to a node A for writing data to the elastic store portion 1 and a group of logical circuits 14 selects either the output terminal 9 or 11 and connects it to a node B for reading out data from the elastic store portion 1. More specifically, an n channel transistor 15 and a p channel transistor 16 connected in parallel are connected between the input terminal 8 and the node A. The switching signal EN1/$\overline{EN2}$ is applied to a control electrode of the n channel transistor 15 from the input terminal 12, and an inverted signal of the switching signal EN1/$\overline{EN2}$ inverted in an inverter 19 is applied to a control electrode of the p channel transistor 16. On the other hand, an n channel transistor 17 and a p channel transistor 18 connected in parallel are connected between the input terminal 10 and the node A. The switching signal EN1/$\overline{EN2}$ is applied to a control electrode of the p channel transistor 18 from the input terminal 12, and the inverted signal of the switching signal EN1/$\overline{EN2}$ as inverted in the inverter 19 is applied to a control electrode of the n channel transistor 17. On the other hand, a gate logical circuit 20 is connected between the node B and the output terminal 9. The gate logical circuit 20 is opened or closed by the switching signal EN1/$\overline{EN2}$ applied to the input terminal 12. In addition, a gate logical circuit 21 is connected between the node B and the output terminal 11. The gate logical circuit 21 is opened or closed by an inverted signal of the switching signal EN1/$\overline{EN2}$ as inverted in an inverter 22.

Description is now made on operation according to an embodiment of the present invention shown in FIG. 2. In FIG. 2, when data is transmitted and received in the first direction, the groups of logical circuits 13 and 14 are controlled by the switching signal EN1/$\overline{EN2}$, so that the input terminal 8 is connected to the node A for writing data to the elastic store portion 1 and at the same time, the output terminal 9 is connected to the node B for reading out data from the elastic store portion 1. On the other hand, when data is transmitted and received in the second direction, the groups of logical circuits 13 and 14 are controlled by the switching signal EN1/$\overline{EN2}$, so that the input terminal 10 is connected to the node A for writing data to the elastic store portion 1 and at the same time, the output terminal 11 is connected to the node B for reading out data from the elastic store portion 1. It is assumed that the switching signal EN1/$\overline{EN2}$ becomes high when data is transmitted and received in the first direction and becomes low when data is transmitted and received in the second direction. When data is transmitted and received in the first direction, a switching signal which is high is applied to the control electrode of the n channel transistor 15 from the input terminal 12, while a switching signal which is low is applied to the control electrode of the p channel transistor 16 through the inverter 19. On the other hand, a switching signal which is high is applied to the control electrode of the p channel transistor 18 from the input terminal 12, while a switching signal which is low is applied to the control electrode of the n channel transistor 17 through the inverter 19. As a result, both the n channel transistor 15 and the p channel transistor 16 are rendered conductive, while both the n channel transistor 17 and the p channel transistor 18 are rendered non-conductive. Thus, only the data input DI1 applied to the input terminal 8 is inputted to the elastic store circuit 1 through the data write node A and is written into each store cell (not shown) constituting the elastic store portion 1, while the address is controlled by the write address initialization signal WR applied through the input terminal 2. At this time, a switching signal which is high is also applied to the gate logical circuit 20 from the input terminal 12 so that the gate logical circuit 20 is opened, while a switching signal which is low is applied to the gate logical circuit 21 through the inverter 22 so that the gate logical circuit 21 is closed. Thus, the data input DI1 in the first direction inputted through the input terminal 8 is once stored in the elastic store portion 1 and then, it is read out from each store cell as the data output DO1 in the first direction and is outputted through the output terminal 9 while the address is controlled by the read address initialization signal RR applied through the input terminal 3 for the purpose of multiplexing, data signalling rate conversion, phase variation absorption and the like.

When data is transmitted and received in the second direction, a switching signal which is low is applied to the control electrode of the n channel transistor 15 from the input terminal 12 and a switching signal which is high is applied to the control electrode of the p channel transistor 16 through the inverter 19. On the other hand, a switching signal which is low is applied to the control electrode of the p channel transistor 18 from the input terminal 12, while a switching signal which is high is applied to the control electrode of the n channel transistor 17 through the inverter 19. As a result, both the n channel transistor 17 and the p channel transistor 18 are rendered conductive, while both the n channel transistor 15 and the p channel transistor 16 are rendered non-conductive. Thus, only the data input DI2 applied to the input terminal 10 is inputted to the elastic store portion 1 through the data write node A and is written into each store cell (not shown) constituting the elastic store portion 1, while the address is controlled by the write address initialization signal WR applied through the input terminal 2. At this time, a switching signal which is low is applied to the gate logical circuit 20 from the input terminal 12 so that the gate logical circuit 20 is closed, while a switching signal which is high is applied to the gate logical circuit 21 through the inverter 22 so that the gate logical circuit 21 is opened. Thus, the data input DI2 in the second direction inputted through the input terminal 10 is once stored in the elastic store portion 1 and then, it is read out from each store cell as the data output DO2 in the second direction and is outputted through the output terminal 11 while the address is controlled by the read address initialization signal RR applied through the input terminal 3 for the purpose of multiplexing, data signalling rate conversion, phase variation absorption and the like.

Figure 3:
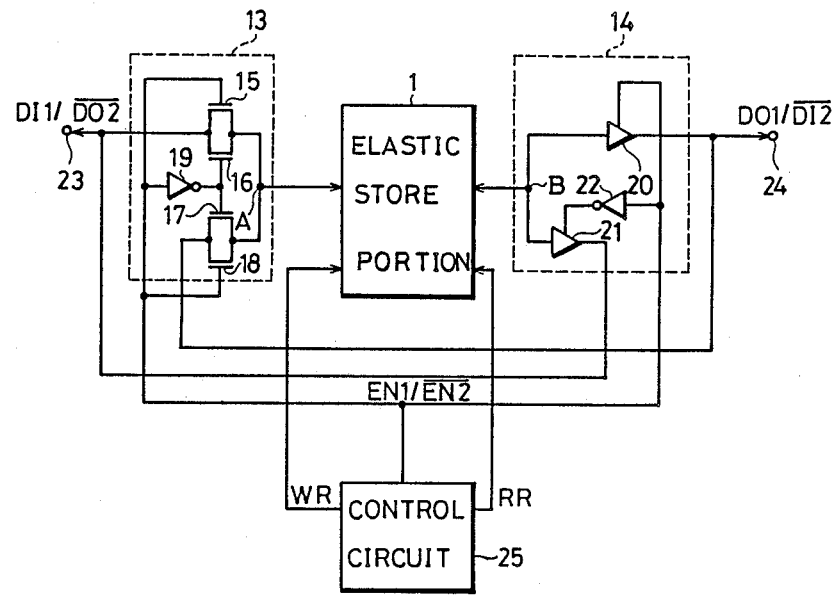
FIG. 3 is a block diagram showing another embodiment of the present invention, in which an input/output terminal is shared.

FIG. 3 is a schematic block diagram showing another embodiment of the present invention. A circuit shown in FIG. 3 is the same as the circuit shown in FIG. 2 except for the following. More specifically, in the circuit shown in FIG. 2, the input terminals 8 and 10 are provided for a data input and the output terminals 9 and 11 are provided for a data output. In the circuit shown in FIG. 3, the input terminal 8 for the data input DI1 in the first direction and the output terminal 11 for the data output DO2 in the second direction in FIG. 2 are connected in common to form a single input/output terminal 23 so that it may be shared with the data input DI1 in the first direction and the data output DO2 in the second direction, and the output terminal 9 for the data output DO1 in the first direction and the input terminal 10 for the data input DI2 in the second direction in FIG. 2 are connected in common to form a single input/output terminal 24 so that it may be shared with the data output DO1 in the first direction and the data input DI2 in the second direction. The switching signal EN1/$\overline{EN2}$ selecting the direction in which data is transmitted and received, that is, the first direction or the second direction, the write address initialization signal WR and the read address initialization signal RR are supplied from a control circuit 25. When the switching signal EN1/$\overline{EN2}$ is high, the data input DI1 in the first direction is inputted to the elastic store portion 1 through the input/output terminal 23 and the group of logical circuits 13 and the data output DO1 in the first direction is outputted from the elastic store portion 1 through the group of logical circuits 14 and the input/output terminal 24, similarly to the circuit shown in FIG. 2. On the other hand, when the switching signal EN1/$\overline{EN2}$ is low, the data input DI2 in the second direction is inputted to the elastic store portion 1 through the input/output terminal 24 and the group of logical circuits 13 and the data output DO2 in the second direction is outputted from the elastic store portion 1 through the group of logical circuits 14 and the input/output terminal 23. More specifically, time divisional use of the elastic store portion 1 and provision of the input/output terminals 23 and 24 can bring about the same effect as that of the embodiment shown in FIG. 2, so that a one-chip semiconductor including the elastic store portion 1 together with a control portion such as the control circuit 25 is effectively formed.

Figure 4:
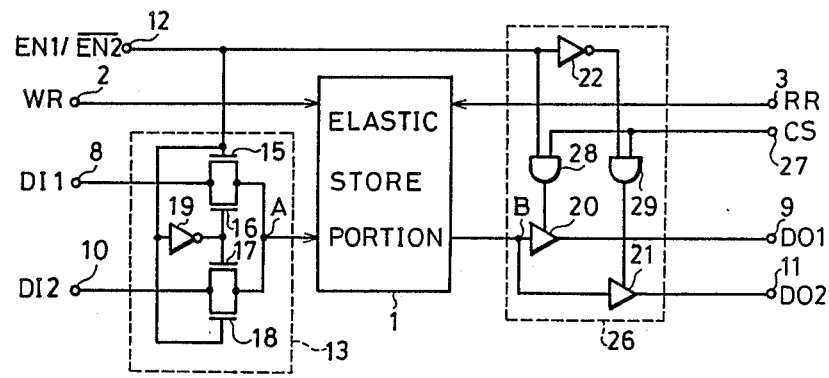
FIG. 4 is a block diagram showing another embodiment of the present invention, in which a wired OR function is achieved.

FIG. 4 is a schematic block diagram showing still another embodiment of the present invention. A circuit shown in FIG. 4 is the same as the circuit shown in FIG. 2 except for the following. More specifically, in a group of logical circuits 26, an AND gate 28 is connected between the input terminal 12 and a control terminal of the gate logical circuit 20 and an AND gate 29 is connected between the inverter 22 and a control terminal of the gate logical circuit 21. The AND gates 28 and 29 have other input terminals connected to a chip selecting signal input terminal 27, respectively. Thus, the AND gates 28 and 29 are opened or closed by a chip selecting signal CS applied to the chip selecting signal input terminal 27, so that a wired OR function is achieved by controlling application of a switching signal to the gate logical circuits 20 and 21.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bidirectional elastic store circuit comprising:
   an elastic store portion having a data write terminal and a data read terminal,
   a first input terminal receiving a data input in a first direction,
   a second input terminal receiving a data input in a second direction opposite to said first direction,
   a first output terminal applying a data output in said first direction,
   a second output terminal applying a data output in said second direction,
   first switching means for selecting either said first input terminal or said second input terminal and connecting said selected input terminal to said data write terminal of said elastic store portion,
   second switching means for selecting either said first output terminal or said second output terminal and connecting said selected output terminal to said data read terminal of said elastic store portion, and
   control means for simultaneously driving said first switching means and said second switching means to that said first input terminal and said first output terminal may be simultaneously selected or said second input terminal and said second output terminal may be simultaneously selected.

2. A bidirectional elastic store circuit in accordance with claim 1, wherein
   said first switching means comprises:
      first logical gate means connected between said first input terminal and said data write terminal, and
      second logical gate means connected between said second input terminal and said data write terminal,
   said second switching means comprises:
      third logical gate means connected between said first output terminal and said data read terminal, and
      fourth logical gate means connected between said second output terminal and said data read terminal, and
   said control means generates a control signal for enabling said first and third logical gates when data is transmitted and received in said first direction and for enabling said second and fourth logical gates when data is transmitted and received in said second direction.

3. A bidirectional elastic store circuit in accordance with claim 1, wherein
   said first input terminal and said second output terminal are coupled to each other to form a first input/output terminal, and
   said first output terminal and said second output terminal are coupled to each other to form a second input/output terminal.

4. A bidirectional elastic store circuit in accordance with claim 1, further comprising:
   means for applying a first signal for initializing the write address of said elastic store portion, and
   means for supplying a second signal for initializing the read address of said elastic store portion.

5. A bidirectional elastic store circuit in accordance with claim 4, wherein
   said first and second signals are applied to said elastic store portion from said control means.

6. A bidirectional elastic store circuit in accordance with claim 1, wherein
   said circuit switching means comprises a logical circuit responsive to an externally applied chip selecting signal for performing a wired OR function.

* * * * *

UNITED STATES PATENT AND TRADEMARK OFFICE
CERTIFICATE OF CORRECTION

PATENT NO. : 4,819,208

DATED : April 4, 1989

INVENTOR(S) : Takeo NAKABAYASHI et al.

It is certified that error appears in the above-identified patent and that said Letters Patent is hereby corrected as shown below:

On the title page, please correct the spelling of the title, to read as shown below:

BIDIRECTIONAL ELASTIC STORE CIRCUIT

Signed and Sealed this

Twelfth Day of December, 1989

*Attest:*

JEFFREY M. SAMUELS

*Attesting Officer*      Acting Commissioner of Patents and Trademarks